United States Patent
Nelson, Jr.

(10) Patent No.: US 6,268,823 B1
(45) Date of Patent: Jul. 31, 2001

(54) UNCONVENTIONAL RANGE NAVIGATION SYSTEM WITH EFFICIENT UPDATE PROCESS

(75) Inventor: Robert Leonard Nelson, Jr., Austin, TX (US)

(73) Assignee: Trimble Navigation LTD, Sunnyvale, CA (US)

( * ) Notice: Subject to any disclaimer, the term of this patent is extended or adjusted under 35 U.S.C. 154(b) by 0 days.

(21) Appl. No.: 09/520,603

(22) Filed: Mar. 8, 2000

(51) Int. Cl.[7] .................................................. G01S 5/14
(52) U.S. Cl. ........................................................ 342/357.02
(58) Field of Search ........................ 342/357.02, 357.12, 342/358; 701/214

(56) References Cited

U.S. PATENT DOCUMENTS 5,957,982 * 9/1999 Hughes et al. ......................... 701/13

* cited by examiner

Primary Examiner—Gregory C. Issing
(74) Attorney, Agent, or Firm—Boris G. Tankhilevich

(57) ABSTRACT

Method and system for determining a position of a platform using a set of range measurements between the platform and a set of known positions that avoids the frequent recalculation of square-roots in range predictions. The platform state estimate is updated by substituting the difference between the square of the range measurement and the square of the distance from the assumed position of the platform to the known position to which the range measurement corresponds scaled by the inverse twice distance between the predicted position of the platform and the known position, for each of the measurement residuals. The predicted state of the platform is updated until the platform state converges on a limit to a desired accuracy.

18 Claims, 3 Drawing Sheets

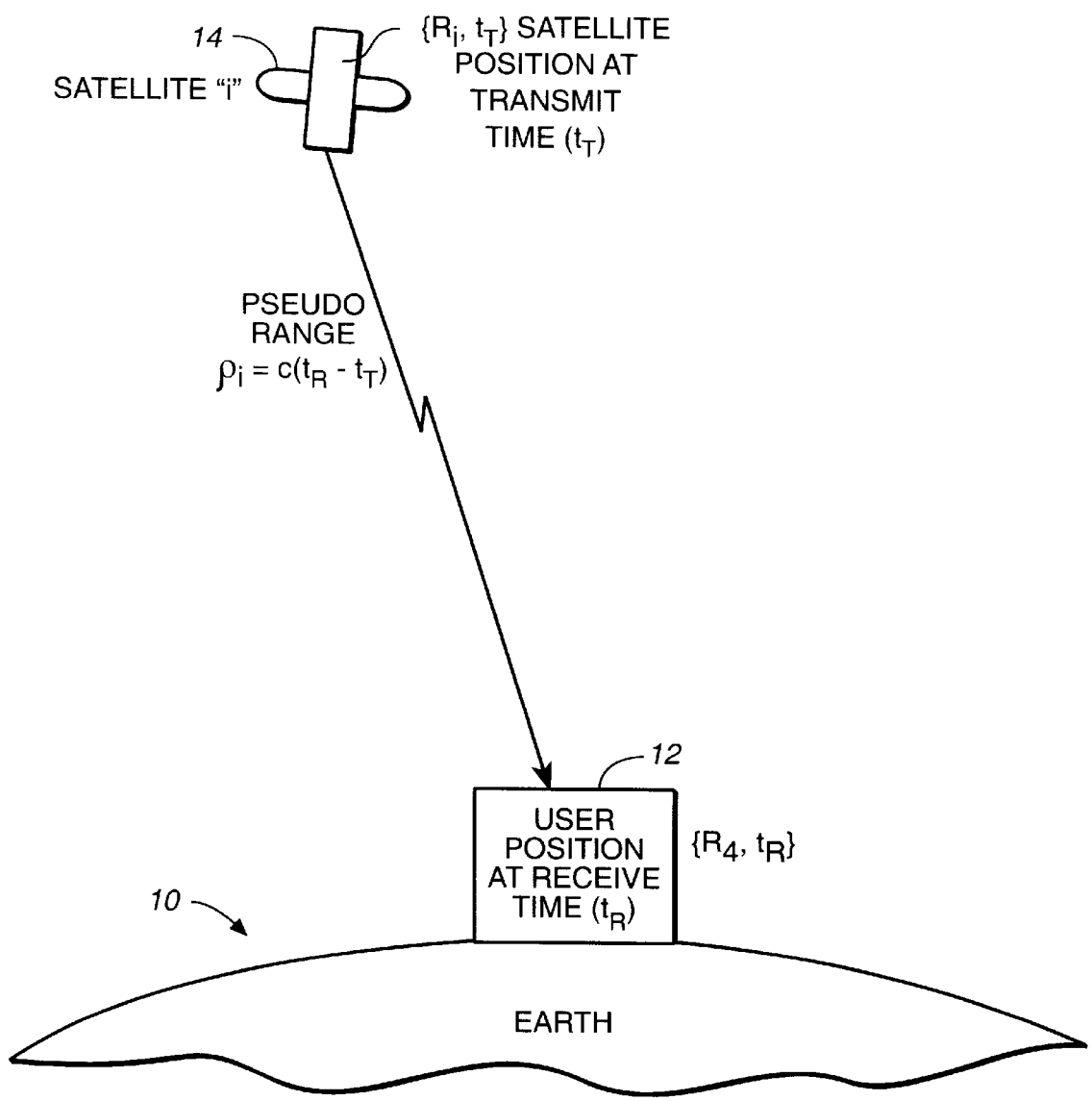
FIG._1
*(PRIOR ART)*

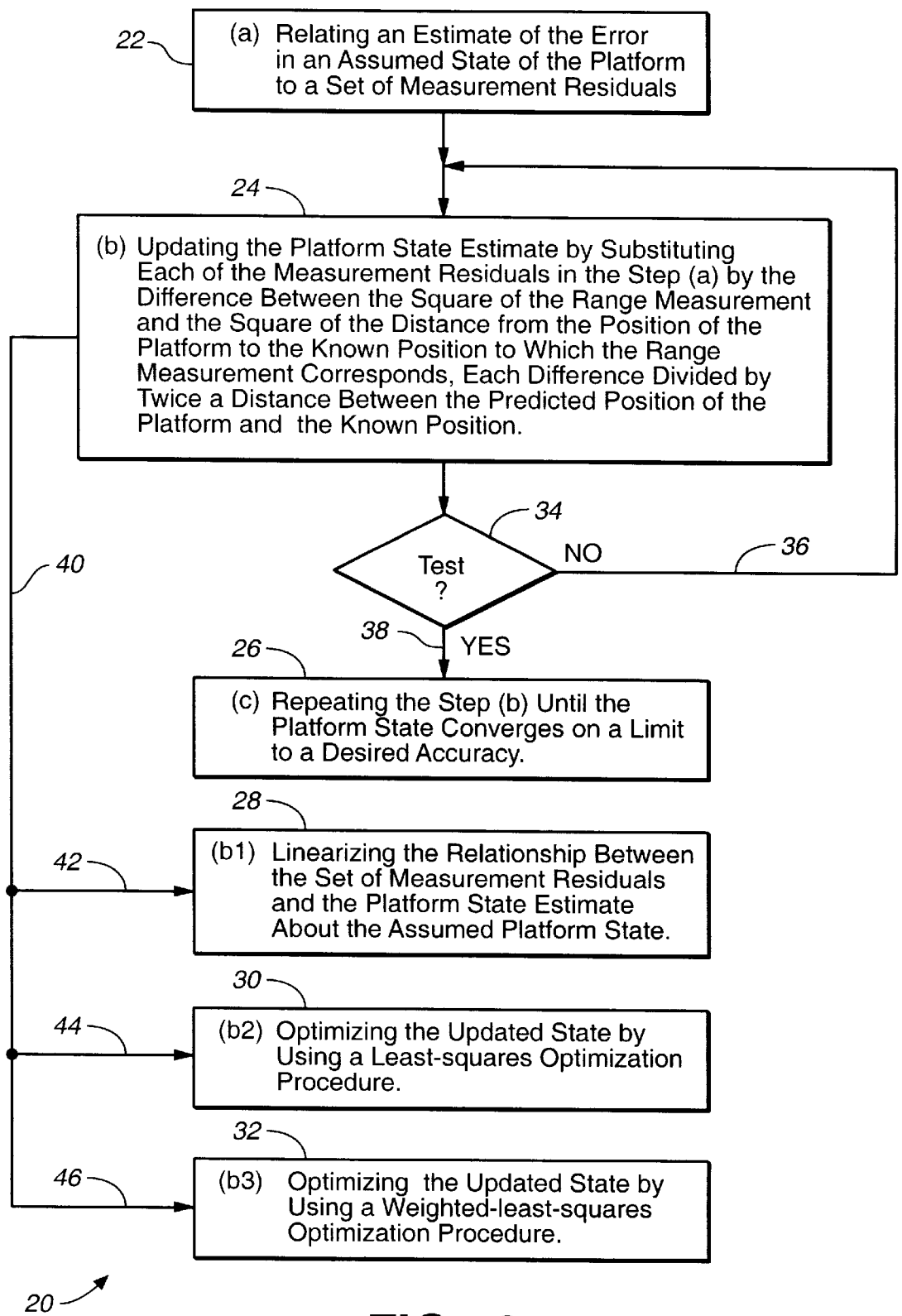
FIG._2

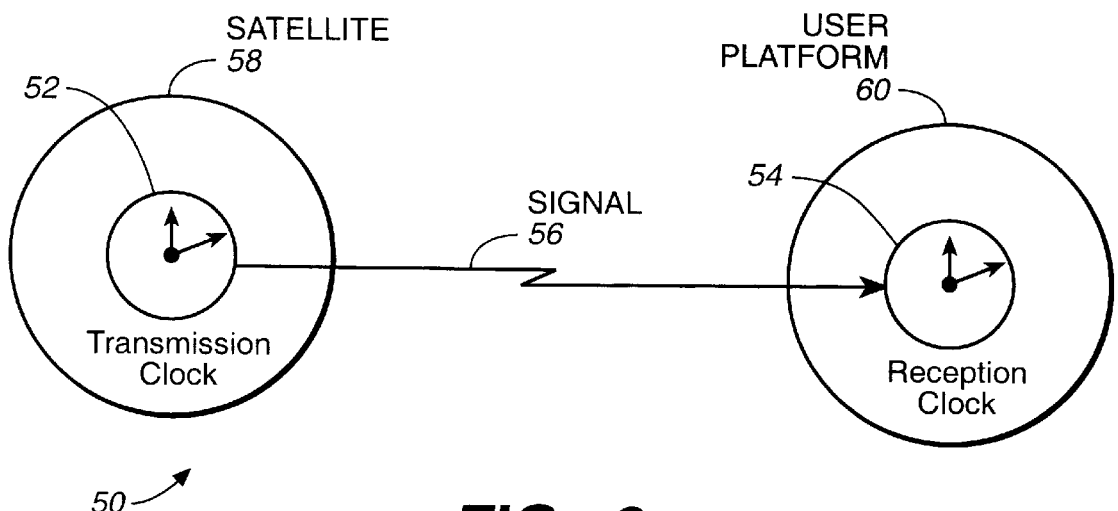
FIG._3
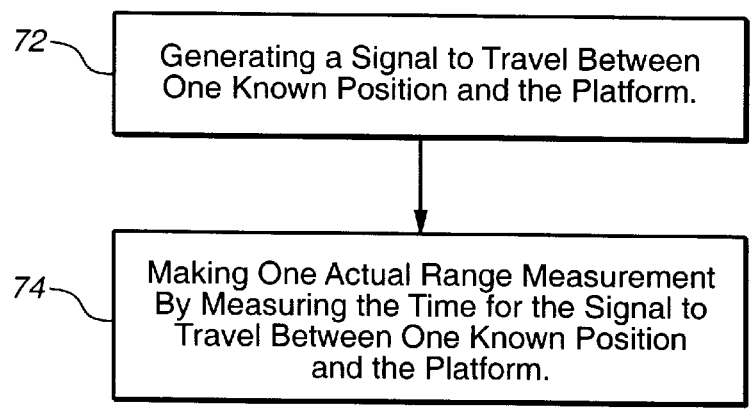
FIG._4

UNCONVENTIONAL RANGE NAVIGATION SYSTEM WITH EFFICIENT UPDATE PROCESS

BACKGROUND

1. Field of the Invention

The present invention relates generally to the field of range navigation systems.

2. Description of the Background Art

In the available art related to range navigation systems, GPS and other navigation systems commonly measure the ranges to several transmitters by observing the times at which signals transmitted at earlier known times are received, wherein the distance is generally proportional to the measured time difference. The measurements are commonly related to an assumed position by subtracting from each range measurement a prediction of the range from that assumed position to the satellite or other navigation transmitter. The measurements are also intrinsically related to the time assumed in making the measurements, since any error in that time appears as an offset in the measured ranges. Such systems then commonly obtain a position fix by updating the assumed position and time on the basis of the discrepancies between the range measurements and predictions.

Although the relationship between the measurements and the physical coordinates of the vehicle is generally nonlinear, navigation systems commonly linearize the relationship about the assumed position and time, using the easily-computed first derivatives of the measurements with respect to the physical coordinates. This assumption of linearity allows the measurement-prediction discrepancies to be expressed easily as a function of the unknown error in the assumed position and time, specifically, as a matrix equation:

$$z=hx; \quad (1)$$

where z is the measurement-discrepancy vector, h is the matrix of partial derivatives of, commonly, three spatial and one temporal physical coordinates, and x is the update vector. The relationship (1) is then easily inverted by well-known matrix methods to express x as a function of z:

$$x=h^{-1}z=nz; \quad (2)$$

where n is the navigation matrix. The resulting vector x in physical coordinates is then commonly applied as an update to the assumed position and time. Furthermore, there are well-known techniques to optimize that update when an excess of measurements over unknowns over-determines the solution, as by the least-squares or weighted-least-squares criteria.

Errors in the elements of z cause errors in the update x. If the z errors are assumed to be uncorrelated and equal in variance, as is generally true of GPS measurements, then the variance of the resulting position-update error is the product of the variance of each element of z with the sum of the squares of the elements of the rows of n that correspond to the three Cartesian position coordinates, by virtue of the statistical orthogonality of the measurements and the geometric orthogonality of the position coordinates. The square-root of that sum of squares is therefore the ratio of the standard deviation of position error to the standard deviation of measurement error and is commonly termed as the "position dilution of precision" or PDOP.

Although this treatment of an essentially nonlinear relationship as linear causes inevitable error in each update, that error is ordinarily negligible, because of the great disparity between the magnitudes of the update on one hand and the distances to the satellites on the other. Moreover, this same consideration makes it unnecessary in many applications to recompute the linearized relationship for each update, since it changes so little. Finally, if the linearized relationship causes update errors to become unacceptable though small compared to the update's size, iteration of the update process with the same set of measurements can reduce the need for frequent recomputation of the update matrix.

Once the measurement-prediction discrepancies z are available, the computation of the update x is a straightforward and relatively inexpensive matrix multiplication. However, the calculation of the predictions of the ranges from the assumed position to the satellites is more difficult, in that it generally requires a square-root operation for each satellite. This follows from the Pythagorean relationship that the square of the range is the sum of the squares of the differences in the three Cartesian coordinates commonly used to express the assumed and satellite positions. Thus, the predicted range to be subtracted from the measured range is the square-root of that sum.

What is needed is an unconventional range navigation system with efficient update process that avoids the frequent recalculation of square-roots in range predictions.

SUMMARY OF THE INVENTION

To address the shortcomings of the available art, the present invention provides a method and a system for determining a position of a platform using a set of range measurements between the platform and a set of known positions that avoids the frequent recalculation of square-roots in range predictions.

In one embodiment, the method comprises the following steps: (a) relating an estimate of the error in an assumed state of the platform to a set of measurement residuals; and (b) updating the platform state estimate by substituting the difference between the square of the range measurement and the square of the distance from the assumed position of the platform to the known position to which the range measurement corresponds, wherein each difference is divided by twice a distance between the predicted position of the platform and the known position, for each of the measurement residuals in the step (a). In another embodiment, the method of the present invention further includes the step (c) of repeating the step (b) until the platform state converges on a limit to a desired accuracy.

The assumed state includes an assumed position of the platform and an assumed bias which is the same in each element of the set of range measurements. Each element of the set of measurement residuals is the difference between an actual range measurement and a predicted range measurement. One actual measurement determines the distance between an actual position of the platform and one known position. The actual measurement includes an actual bias which is the same for each element of the set of range measurements. The predicted range measurement is a distance between the predicted position of the platform and one known position.

In one embodiment, the actual range measurement is performed by measuring the time for a signal to travel between one known position and the platform. The actual bias associated with this actual range measurement is due to a discrepancy between a transmission clock used to measure the time instance when the signal was transmitted and between a reception clock used to measure the time instance when the signal was received. In one embodiment, a radio signal generated using a transmitter located at one known position is used to perform an actual range measurement. In the preferred embodiment, the radio signal is generated using a GPS satellite. In an alternative embodiment, the radio signal is generated using a GLONASS satellite.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a prior art pseudorange measurement model.

FIG. 2 illustrates the flow chart describing the basic steps of the method of the present invention for determining a position of a platform using a set of range measurements between the platform and a set of known positions.

FIG. 3 shows the origin of the actual bias that is due to a discrepancy between a transmission clock used to measure the time instance when the signal is transmitted and between a reception clock used to measure the time instance when the signal is received.

FIG. 4 illustrates the flow chart describing the process of making one actual range measurement by measuring the time for the signal to travel between one known position and the platform.

DETAILED DESCRIPTION OF THE PREFERRED AND ALTERNATIVE EMBODIMENTS

FIG. 1 depicts a prior art measurement model (10) that is used by a satellite signal processor to estimate the observer state. In the preferred embodiment, an i-th satellite 14 is a GPS satellite.

The Global Positioning System (GPS) is a system of satellite signal transmitters that transmits information from which an observer's present location and/or the time of observation can be determined. Another satellite-based navigation system is called the Global Navigation Satellite System (GLONASS), which can operate as an alternative or supplemental system. The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHZ (nineteen centimeter carrier wavelength) and an L2 signal having a frequency f2=1227.6 MHZ (twenty-four centimeter carrier wavelength). These two frequencies are integral multiplies f1=1,540 f0 and f2=1,200 f0 of a base frequency f0=1.023 MHZ. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below. Use of PRN codes allows use of a plurality of GPS satellite signals for determining an observer's position and for providing the navigation information.

A signal transmitted by a particular GPS satellite is selected by generating and matching, or correlating, the PRN code for that particular satellite. Some of the PRN codes are known and are generated or stored in GPS satellite signal receivers operated by users. A first known PRN code for each GPS satellite, sometimes referred to as a precision code or P-code, is a relatively long, fine-grained code having an associated clock or chip rate of f0=10.23 MHZ. A second known PRN code for each GPS satellite, sometimes referred to as a coarse/acquisition code or C/A-code, is intended to facilitate rapid satellite signal acquisition and hand-over to the P-code and is a relatively short, coarser-grained code having a clock or chip rate of f0=1.023 MHZ. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein. The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 baud.

A second satellite-based navigation system is the Global Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9k/16) GHz and f2=(1.246+7k/16) GHz, where k (=1,2, . . . 24) is the channel or satellite number. These frequencies lie in two bands at 1.597–1.617 GHz (L1) and 1.240–1.260 GHz (L2). The L1 signal is modulated by a C/A-code (chip rate=0.511 MHZ) and by a P-code (chip rate=5.11 MHZ). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

Referring still to FIG. 1, as was mentioned above, in the preferred embodiment, the i-th SATPS satellite 14 is an i-th GPS satellite. The range ($R_i$) between the location of the i-th GPS satellite 14 and the GPS receiver 12 is equal to the speed of light c times ($\Delta t_i$), wherein ($\Delta t_i$) is the time difference between the GPS receiver's clock and the time indicated by the satellite when it transmitted the relevant phase. However, the GPS receiver 12 has an inexpensive quartz clock which is not synchronized with respect to the much more stable and precise atomic clocks carried on board the satellites. Consequently, the GPS receiver estimates a pseudo-range ($\rho_i$) (not a true range) to each satellite in order to obtain a navigation solution. A navigation solution is an estimate of the user position plus any other required parameters. The term "state" is used to describe all the parameters to be determined. The typical state in a GPS navigation estimator are three components of position, clock offset, and clock drift. A navigation algorithm embedded in the GPS receiver combines raw measurements from the signal processor with GPS satellite orbit data to estimate the observer state. This process requires two sets of models—a measurements model and a dynamics or process model. The dynamics model describes the evolution of the system state. The measurements model relates the state to the GPS observations. The focus of the present invention is on the GPS pseudorange measurements model.

When the signal processor finds the point of maximum correlation with a given GPS satellite signal, it produces an observation of the code phase, or equivalently, signal transmit time $t_T$ for the current local receive time $t_R$. The observed signal propagation delay is ($t_R-t_T$). The pseudorange observable is this time scaled by the speed of light in a vacuum:

$$\rho=c(t_R-t_T). \quad (3)$$

The pseudorange observable between the user 12 and the i-th GPS satellite 14 is related to the user position and clock states as follows:

$$\rho_i=|R_i-R_u|+cb_u+\epsilon_{\rho i}; \quad (4)$$

wherein $R_i$ is the satellite position at transmit time; $R_u$ is the receiver position at receive time; $b_u$ is the bias in the receiver clock; and $\epsilon_{\rho i}$ is the composite of errors produced by atmospheric delays, satellite atmospheric mismodeling, selective availability (SA), receiver noise, etc.

The state to be estimated, consisting of $R_u$ and $cb_u$ is embedded in this measurement equation. To extract it one should linearize the measurement equation about some nominal value, for example, about the current best estimate. Given an a priori estimate of the state:

$$X\hat{}=[R_u\hat{}^T; cb_u\hat{}]^T; \quad (5)$$

and an estimate of the bias contributions $b_u\hat{}$ caused by ionospheric and tropospheric delay, relativistic effects, satellite clock errors $\epsilon_{\rho i}\hat{}$, one can predict that the pseudorange measurement should be as follows:

$$\rho_i\hat{}=|R_i-R_u\hat{}|+cb_u\hat{}+\epsilon_{\rho i}\hat{}. \quad (6)$$

The measurement residual $\Delta\rho$, which is the difference between the predicted and actual measurement, can be modeled as linearly related to the error in the state estimate $\Delta X \equiv [\Delta R^T; c\Delta b]^T$, by performing a Taylor expansion about the current state estimate. The linearized result is given by the following:

$$\Delta\rho_i = \hat{\rho}_i - \rho_i = [-1_i^{\hat{}T}; 1]\begin{bmatrix}\Delta R \\ c\Delta b\end{bmatrix} + \Delta\epsilon_{\rho i}; \quad (7)$$

wherein $$1\hat{}_i \equiv (R_i-R_u\hat{})/|R_i-R_u\hat{}|; \quad (8)$$

$$\Delta R \equiv (R_u\hat{}-R_u); \quad (9)$$

$$\Delta b \equiv (b_u\hat{}-b_u); \quad (10)$$

$$\Delta\epsilon_{\rho i} \equiv (\epsilon\hat{}_{\rho i}-\epsilon_{\rho i}); \quad (11)$$

and wherein $1\hat{}_i$ is the estimated line of sight unit vector from the user to the satellite; and $\Delta\epsilon_{\rho i}$ is the residual error after the known biases have been removed.

This linearized model is the fundamental GPS pseudorange measurement equation. The residual measurement error $\Delta\epsilon_{\rho i}$ is generally composed of a slowly varying term, usually dominated by SA in civilian receivers, plus random or white noise. The expected variance of the error is required for many weighted navigation solution algorithms. An order of magnitude estimate of the slow terms can be obtained from the user equivalent range error (URE) reported in the Navigation message. The high-frequency error is produced primarily by receiver noise and quantization. For a typical receiver, the standard deviation is about 1/100 of the code chip, or about 3 meters for C/A code and 0.3 meters for P code. The given above discussion can be found in the "Global Positioning System: Theory and Applications", Volume I, edited by Bradford W. Parkinson and James J. Spilker Jr., and published by the American Institute of Aeronautics and Astronautics, Inc. in 1996, and more specifically, in the chapter 9, by P. Axelrod and R. G. Brown.

In the described above prior art measurements model, the calculation of the predictions of the ranges from the assumed position to the satellites requires a square-root operation for each satellite. This follows from the Pythagorean relationship that the square of the range is the sum of the squares of the differences in the three Cartesian coordinates commonly used to express the assumed and satellite positions. Thus, the predicted range to be subtracted from the measured range is the square-root of that sum.

The present invention discloses an unconventional range navigation system with efficient update process that avoids the frequent recalculation of square-roots in range predictions. Indeed, in the present invention, the scaled difference of squares between the measured ($m=|R_i-R_u|$) and predicted ($p=|R_i-R_u^{\wedge}|$) ranges ($m^2-p^2$)/2m is used instead of the difference between the measured and predicted ranges (m−p). This substitution removes the necessity of using the square root operation to obtain the predicted range p, so that the square root nonlinearity is removed from the calculations of the difference (m−p) between the measured and predicted ranges. The scale factor (1/2m) is the inverse of the approximately twice the distance to the satellite. The difference of squares ($m^2-p^2$) is essentially linear because it is a very small difference between two huge numbers. In geometrical terms, the straight line is substituted for the parabola. Indeed:

$$(m^2-p^2)/2m=(m+p)(m-p)/2m=(2m-m+p)(m-p)/2m=(m-p-(m-p)^2/2m)=((m-p)(1-(m-p)2m))\approx(m-p)(1-\epsilon); \qquad (12)$$

wherein $\epsilon$ is a very small relative error.

Except for the relative error $\epsilon$, which will be seen to be quite small, this is equivalent to simply subtracting the prediction p from the measurement m. The measurement-prediction discrepancy for any satellite cannot exceed the size of the position update plus the time update, scaled to units of position by the speed of light. At an update rate of one per second, a speed of 300 meters-per-second (which is about Mach 1), and with a clock-rate error of one part per million, the worst-case discrepancy is therefore 600 meters. The worst-case (closest) distance to the satellite is 20 megameters. Thus the greatest value of the resulting relative error c in the discrepancy measurement is:

$$\epsilon \leq 600 \text{ meters}/(2)(20,000,000)\text{meters}=0.000015. \qquad (13)$$

If it is assumed that the worst PDOP that a navigation system will tolerate is 12 and conservatively setting the standard deviation of the discrepancy to the worst-case value of 600 meters, the standard deviation D of relative error in the update is:

$$D=PDOP\epsilon=(12)(0.000015)=0.00018; \qquad (14)$$

which is negligible for any practical navigation purpose. Thus, by squaring of the measurement and dividing by twice the distance to the satellite one can substantially increase the speed the computation compared to a prior art square-root operation.

In another embodiment of the present invention, the navigation matrix n is not recomputed for each update. Instead, by effectively dividing the column of n corresponding to each satellite by approximately twice the distance to that satellite, one can embed part of the recurring calculation of the discrepancies into the matrix n. Whether a measurement or a prediction, which would require an occasional square-root operation, is used for this divisor makes little difference, since the predominant error is due to the divisor's staleness. The relative error of the effective discrepancy is about the same as that of the divisor. Assuming the same speed s=300 meters-per-second (which is about Mach 1), the same update rate of one per second, and the worst-case PDOP=12, and the worst-case (closest) distance to the satellite 20 megameters corresponding to the worst-case PDOP=12, a relative update error of D=0.01 is not reached until more than t seconds:

$$t=DR/s \; PDOP=(0.01)(20000000 \; m)/(12)(300 \; m/s)\approx 56 \text{ seconds} \quad (15)$$

have lapsed since the computation of the modified navigation matrix n.

FIG. 2 illustrates the flow chart 20 describing the basic steps of the method of the present invention for determining a position of a platform using a set of range measurements between the platform (or user) position $R_u$ and a set of known positions $R_i$. In the preferred embodiment, the GPS satellites 14 (of FIG. 1) are used as the set of known positions $R_i$. The initial state of the platform 12 is an assumed state that includes an assumed position of the platform $R_u$ and an assumed bias $cb_u$, which is the same in each element of the set of range measurements. Each element of the set of measurement residuals is the difference between an actual range measurement $|R_i-R_u|$ that determines the distance between an actual position of the platform and one known position, and a predicted range measurement $|R_i-R_u^{\wedge}|$ that is the distance between the predicted position of the platform and one known position. Each actual measurement includes an actual bias $cb_u$ that is due to a discrepancy between a transmission clock used to measure the time instance when the signal was transmitted and between a reception clock used to measure the time instance when the signal was received. The actual bias is assumed to be the same for each element of the set of range measurements.

In one embodiment, the method for determining a position of a platform using a set of range measurements between the platform and a set of known positions includes two basic steps. In the first basic step (22 of FIG. 2) an estimate of the error in an assumed state of the platform is related to a set of measurement residuals. In the preferred embodiment, the relationship between the set of measurement residuals and the platform state estimate about the assumed platform state is linearized (step 28) according to eq (7).

In the second basic step (24 of FIG. 2) the platform state estimate is updated by substituting the difference between the square of the range measurement and the square of the distance from the position of the platform to the known position to which the range measurement corresponds scaled by the inverse twice distance between the predicted position of the platform and the known position for each of the measurement residuals in the step (22). As was explained above, this is the key difference between the prior art conventional navigation system with inefficient update process and the present invention that introduces the unconventional range navigation system with efficient update process. Preferably, the step (24) is repeatedly updated (step 26) until the test (34) is satisfied. In the preferred embodiment, the test (34) is satisfied if the platform state converges on a limit to a desired accuracy. In one embodiment, when an excess of measurements over unknowns over-determines the solution, thee updated state is optimized using a least-squares optimization procedure, or a weighted-least-squares optimization procedure.

As depicted in FIG. 3, the actual bias associated with the actual range measurement is due to a discrepancy between a transmission clock 52 (of FIG. 3) used to measure the time instance when the signal 56 was transmitted and between a reception clock 54 (of FIG. 3) used to measure the time instance when the signal was received.

FIG. 4 illustrates the flow chart describing the step (72) of generating a signal configured to travel between one known position and the platform, and the step (74) of making one actual range measurement by measuring the time for the signal to travel between one known position and the platform. As was explained above, in the preferred embodiment, the i-th GPS satellite 14 having a known position $R_i$ generates a radio signal 56 (of FIG. 3) at the signal transmit time $t_T$. In the preferred embodiment, the GPS signal 56 is received at the current local receive time $t_R$ by the GPS receiver 12 (of FIG. 1) having position $R_u$.

The description of the preferred and alternative embodiments of this invention is given for purposes of explaining the principles thereof and enabling one skilled in the relevant art to make the invention, and is not to be considered as limiting or restricting the invention, since many modifications may be made by the exercise of skill in the art without departing from the scope of the invention.

What is claimed:

1. A method for determining a position of a platform using a set of range measurements between said platform and a set of known positions, said method comprising the steps of:

(a) relating an estimate of the error in an assumed state of said platform to a set of measurement residuals;
   wherein said assumed state includes an assumed position of said platform and an assumed bias which is the same in each element of said set of range measurements;
   and wherein each element of said set of measurement residuals is the difference between an actual range measurement and a predicted range measurement;
   and wherein one said actual measurement determines the distance between an actual position of said platform and one said known position;
   and wherein each said actual measurement includes an actual bias which is the same for each element of said set of range measurements;
   and wherein said predicted range measurement is a distance between said predicted position of said platform and one said known position; and (b) updating said platform state estimate by substituting the difference between the square of said range measurement and the square of the distance from said position of said platform to said known position to which said range measurement corresponds, each difference divided by twice a distance between said predicted position of said platform and said known position, for each of said measurement residuals in said step (a).

2. The method of claim 1 further including:
   the step (c) of repeating said step (b) until said platform state converges on a limit to a desired accuracy.

3. The method of claim 1 further including the steps of:
   generating a signal to travel between one said known position and said platform; and
   making one said actual range measurement by measuring the time for said signal to travel between one said known position and said platform, wherein said actual bias associated with said actual range measurement is due to a discrepancy between a transmission clock used to measure the time instance when said signal was transmitted and between a reception clock used to measure the time instance when said signal was received.

4. The method of claim 3, wherein said step of generating said signal further includes the step of:
   generating a radio signal.

5. The method of claim 4, wherein said step of generating said radio signal further includes the step of:
   generating said radio signal using a transmitter located at one said known position.

6. The method of claim 4, wherein said step of generating said radio signal further includes the step of:
   generating said radio signal using a satellite.

7. The method of claim 4, wherein said step of generating said radio signal further includes the step of:
   generating said radio signal using a GPS satellite.

8. The method of claim 4, wherein said step of generating said radio signal further includes the step of:
   generating said radio signal using a GLONASS satellite.

9. The method of claim 1, wherein said step (b) of updating said platform state estimate further includes the step of:
   linearizing the relationship between said set of measurement residuals and said platform state estimate about said assumed platform state.

10. The method of claim 1, wherein said step (b) of updating said platform state estimate further includes the step of:
    optimizing said updated state by using a least-squares optimization procedure.

11. The method of claim 1, wherein said step (b) of updating said platform state estimate further includes the step of:
    optimizing said updated state by using a weighted-least-squares optimization procedure.

12. A system for determining a position of a platform using a set of range measurements between said platform and a set of known positions, said system comprising:

(a) means for relating an estimate of the error in an assumed state of said platform to a set of measurement residuals;
    wherein said assumed state includes an assumed position of said platform and an assumed bias which is the same in each element of said set of range measurements;
    and wherein each element of said set of measurement residuals is the difference between an actual range measurement and a predicted range measurement;
    and wherein one said actual measurement determines the distance between an actual position of said platform and one said known position;
    and wherein each said actual measurement includes an actual bias which is the same for each element of said set of range measurements;

and wherein said predicted range measurement is a distance between said predicted position of said platform and one said known position; and (b) means for updating said platform state estimate by substituting the difference between the square of said range measurement and the square of the distance from said position of said platform to said known position to which said range measurement corresponds, each difference divided by twice a distance between said predicted position of said platform and said known position, for each of said measurement residuals.

13. The system of claim 12, wherein said means (b) for updating said platform state estimate further includes:

(c) means for repeated substitution the difference between the square of said range measurement and the square of the distance from said position of said platform to said known position to which said range measurement corresponds, for each of said measurement residuals until said platform state converges on a limit to a desired accuracy.

14. The system of claim 12 further including:

a means for generating a signal; and a time measuring means for measuring the time for said signal to travel between one said known position and said platform.

15. The system of claim 14, wherein said means for generating said signal further includes:

a means for generating a radio signal.

16. The system of claim 14, wherein said means for generating said signal further includes:

a satellite radio transmitter.

17. The system of claim 14, wherein said means for generating said signal further includes:

a GPS satellite radio transmitter.

18. The system of claim 14, wherein said means for generating said signal further includes:

a GLONASS satellite radio transmitter.

* * * * *